United States Patent
Bateman

(10) Patent No.: US 11,948,467 B2
(45) Date of Patent: Apr. 2, 2024

(54) SYSTEM, DEVICE AND METHOD FOR MEASURING ATMOSPHERIC CONDITIONS

(71) Applicant: Barron Associates, Inc., Charlottesville, VA (US)

(72) Inventor: Alec Jacob Devine Bateman, Charlottesville, VA (US)

(73) Assignee: Barron Associates, Inc., Charlottesville, VA (US)

(*) Notice: Subject to any disclaimer, the term of this patent is extended or adjusted under 35 U.S.C. 154(b) by 278 days.

(21) Appl. No.: 17/316,914

(22) Filed: May 11, 2021

(65) Prior Publication Data

US 2022/0375356 A1 Nov. 24, 2022

(51) Int. Cl.
*G08G 5/00* (2006.01)
*B64C 39/02* (2023.01)
*B64U 101/35* (2023.01)

(52) U.S. Cl.
CPC ......... *G08G 5/0091* (2013.01); *B64C 39/024* (2013.01); *G08G 5/0034* (2013.01); *G08G 5/0039* (2013.01); *B64U 2101/35* (2023.01)

(58) Field of Classification Search
CPC .. G08G 5/0091; G08G 5/0034; G08G 5/0039; B64C 39/024; B64U 2101/35
See application file for complete search history.

(56) References Cited

U.S. PATENT DOCUMENTS

| | | | |
|---|---|---|---|
| 6,043,756 A | 3/2000 | Bateman et al. | |
| 6,456,226 B1 | 9/2002 | Zheng et al. | |
| 6,501,392 B2 | 12/2002 | Gremmert et al. | |
| 9,310,222 B1 | 4/2016 | Suiter et al. | |
| 9,594,162 B1 | 3/2017 | Sonera et al. | |
| 9,959,771 B1 | 5/2018 | Carlson | |
| 10,017,272 B1 | 7/2018 | Olivo et al. | |
| 10,181,267 B2 | 1/2019 | Karunakar et al. | |
| 10,203,410 B2 | 2/2019 | Foltan et al. | |
| 10,497,129 B1* | 12/2019 | Cui | G06V 20/13 |
| 2010/0274542 A1* | 10/2010 | Krupansky | G01W 1/10 703/6 |
| 2017/0174363 A1* | 6/2017 | Love | B64F 5/60 |
| 2018/0286253 A1* | 10/2018 | Darnell | G08G 5/0039 |

(Continued)

OTHER PUBLICATIONS

Meymaris et al., "Quality Control of EDR Date and Implications for Use", National Center for Atmospheric Research (NCAR), Nov. 15, 2012.

(Continued)

*Primary Examiner* — Anne Marie Antonucci
*Assistant Examiner* — Wesam Almadhrhi
(74) *Attorney, Agent, or Firm* — Williams Mullen; Thomas P. Bergert

(57) ABSTRACT

Embodiments of a system, device and method improve weather modeling approaches for use by air vehicles to mitigate weather hazards and/or optimize air vehicle operations. Various embodiments collect a set of independent measurements of atmospheric parameters of interest, collect a set of onboard measurements from one or more non-traditional atmospheric sensors onboard an air vehicle, process the collected measurements to identify values of selected atmospheric parameters and generate a model for relating raw sensor outputs from the non-traditional atmospheric sensors to the atmospheric parameters of interest.

20 Claims, 8 Drawing Sheets

(56) References Cited

U.S. PATENT DOCUMENTS

2020/0013299 A1   1/2020  Jacobson et al.
2020/0130828 A1*  4/2020  Pandit .................. G06Q 10/063
2020/0142094 A1*  5/2020  George .................. G01P 5/245
2021/0314677 A1* 10/2021  McPartland ............ G01W 1/08

OTHER PUBLICATIONS

"AAM Ecosystem Community Integration Working Group: Weather Sensing, Forecasting, and Decision Support", National Aeronautics and Space Administration (NASA), Nov. 5, 2020.

Meymaris et al., "NCAR In Situ Vertical winds-based EDR Estimate Algorithm Description [M]", University of Corporation for Atmospheric Research (UCAR), Ver 0.9, Mar. 21, 2013, pp. 8-18, Mar. 21, 2013.

Bateman et al. "Onboard Turbulence Recognition System for Improved UAS Operator Situational Awareness", American Institute of Aeronautics Astronautics (AIAA) Scitech Forum, p. 2196, 2020.

Jacob, UAS for Improved Weather Awareness WINDMAP: Weather Intelligent Navigation Data and Models for Aviation Planning—NASA ULI, Oklahoma State University.

Passner, "Using the Advanced Research Version of the Weather Research and Forecasting Model (WRF-ARW) to Forecast Turbulence at Small Scales", Army Research Laboratory (ARL) White Sands Missile Range NM Computational and Information Science Directorate, ARL-TR-4575, Sep. 2008.

Sharman et al., "Description and Derived Climatologies of Automated In Situ Eddy-Dissipation-Rate Reports of Atmospheric Turbulence", Journal of Applied Meteorology and Climatology 53.6, pp. 1416-1432, vol. 53, Jan. 28, 2014.

Smalikho, "Accuracy of the Turbulent Energy Dissipation Rate Estimation from the Temporal Spectrum of Wind Velocity Fluctuations", Institute of Atmospheric Optics (Atmos. Oceanic Opt.), Atmospheric and Oceanic Optics C/C of Optika Atmosfery I Okeana 10 , vol. 10, No. 8, pp. 559-563, Aug. 1997.

Takacs et al., "Using in SITU Eddy Dissipation Rate (EDR) Observations for Turbulence Forecast Verification", 12th Conference on Aviation Range and Aerospace Meteorology, pp. 1-17, 2006.

* cited by examiner

SYSTEM, DEVICE AND METHOD FOR MEASURING ATMOSPHERIC CONDITIONS

STATEMENT

This invention was made with government support under contract no. 80NSSC19C0107 awarded by the United States National Aeronautics and Space Administration (NASA). The government has certain rights in the invention.

TECHNICAL FIELD

The present disclosure pertains to aircraft systems, and more particularly to a system, device and method for measuring atmospheric parameters using aircraft systems.

BACKGROUND AND SUMMARY

Many air vehicles carry a variety of sensors to support functions including flight control and mission management either by a human or an automated system, propulsion control that may or may not be tightly integrated with flight control functions, and execution of mission tasks such as collection of imagery and other data from payload sensors. The sensors onboard an air vehicle that are not primarily intended for use as atmospheric sensors can be referred to as the existing onboard sensors. Nevertheless, these existing onboard sensors may be leveraged for other purposes that are not the primary purpose for which they were designed or integrated on the aircraft.

Sensing of atmospheric conditions is one possible area that is of increasing importance for some emerging types of air vehicles and air vehicle operations. Though dedicated atmospheric sensors may be added to a vehicle, the impact in terms of size, weight, power draw and cost of the sensor hardware, as well as the cost of systems integration, may be prohibitive. Exploiting existing onboard sensors provides an opportunity to implement an atmospheric sensing system at low-cost. Such a system can potentially utilize large fleets of air vehicles, including heterogeneous fleets of air vehicle, and routine operations of these vehicles primarily for purposes other than atmospheric sensing, to maximize its effectiveness and realize a distributed sensing system that provides sensing at high temporal and spatial resolutions in regions that are relevant to the safety of air vehicle operations. Such a system can be augmented by vehicles, including low-cost small unmanned aircraft systems (SUAS), performing dedicated atmospheric sensing missions either with or without dedicated atmospheric sensors. The outputs of such a system can serve multiple purposes, including (1) direct use by the air vehicle performing the sensing and by other air vehicles to mitigate weather hazards or to optimize air vehicle operations, e.g., to maneuver away from or avoid areas of turbulence that increase energy consumption but are not expected to be hazardous, (2) to provide initial conditions to numerical weather prediction models, (3) to improve weather modeling approaches.

One of the challenges in implementing such a system is that existing onboard sensors, i.e., non-traditional atmospheric sensors, may not directly measure the parameters of interest, and/or may not provide the same accuracy and precision as dedicated atmospheric sensors. The characteristics will in general vary among different types of vehicles and may also vary among different vehicles of the same type. To implement a practical atmospheric sensing system using existing onboard sensors, it is necessary to implement methods for creating models that relate the raw sensor outputs to the atmospheric parameters of interest, and to rigorously quantify the uncertainty in the atmospheric parameter estimates so that the information can be used appropriately.

The present disclosure describes a system, device and method that overcomes the technical challenges described above. Disclosed embodiments operate to collect a set of independent measurements of atmospheric parameters of interest, collect a set of onboard measurements comprising measurements from one or more non-traditional atmospheric sensors onboard a vehicle, where the measurements may be collected during one or more flight operations of the vehicle, process the collected set of independent measurements and the collected set of onboard measurements to identify selected atmospheric parameters and generate, based on the selected atmospheric parameters and the collected set of onboard measurements, a model for relating raw sensor outputs from the non-traditional atmospheric sensors to the atmospheric parameters of interest. Other embodiments can be employed to select and apply a model from a group of available models in relating the raw sensor outputs to the atmospheric parameters of interest.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Example embodiments such as disclosed herein can incorporate a controller having a processor and an associated memory storing instructions that, when executed by the processor, cause the processor to perform operations as described herein. It will be appreciated that reference to "a", "an" or other indefinite article in the present disclosure encompasses one or more than one of the described element. Thus, for example, reference to a processor encompasses one or more processors, reference to a sensor encompasses one or more sensors, reference to a sensor output encompasses one or more sensor outputs and so forth.

Figure 1:
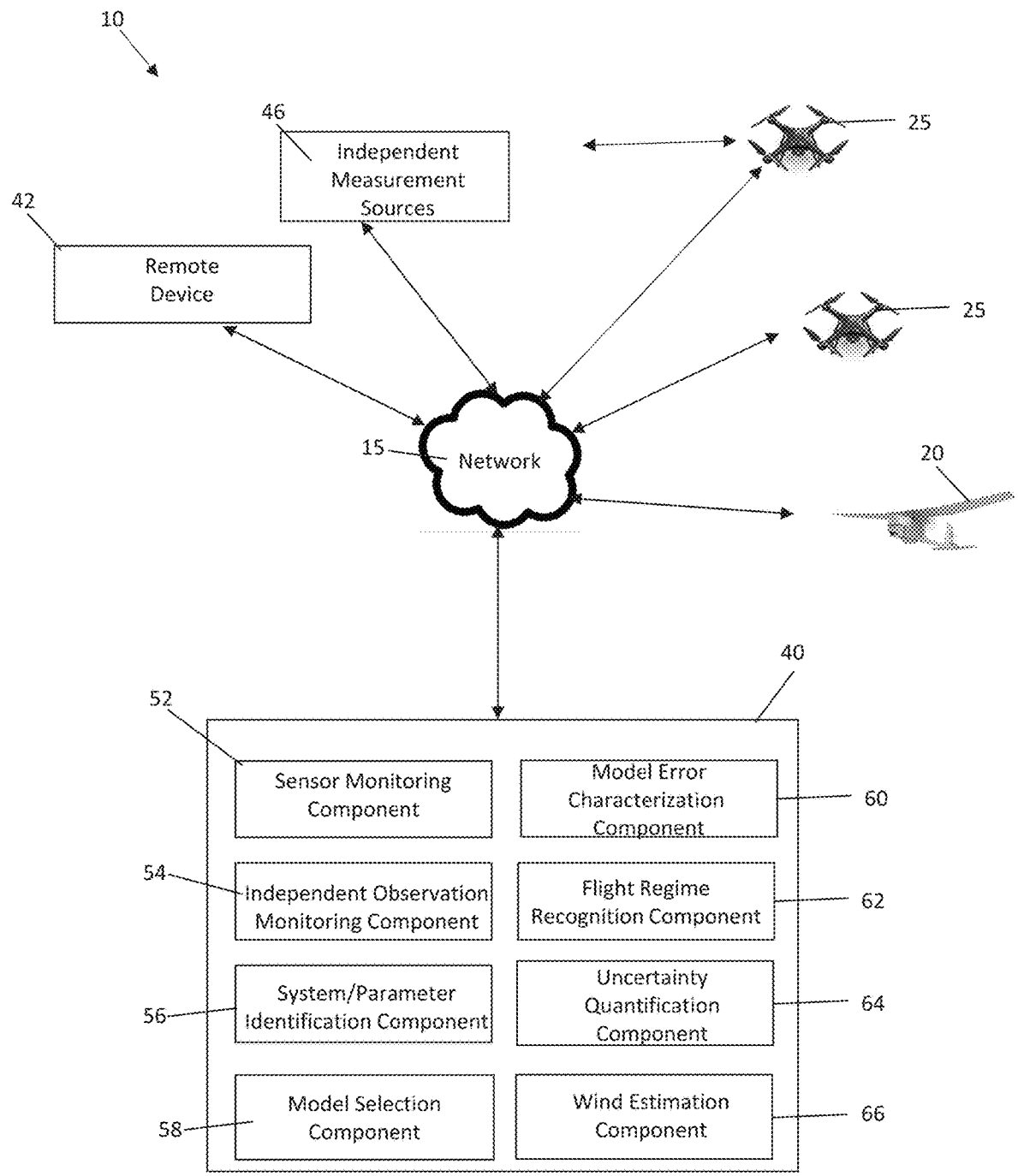
FIG. 1 is an exemplary schematic diagram of a system in accordance with embodiments of the present disclosure.

As shown in FIG. 1, embodiments of a system 10 in accordance with the present disclosure can include a remote server or device 40 in communication over a network 15 with one or more aircraft 20, 25. It will be appreciated that embodiments of the present disclosure can work equally well with all types of aircraft. However, for purposes of discussion, much of the present disclosure refers to unmanned aerial vehicles (UAVs). It will be appreciated that the system 10 can work with and/or employ more than one aircraft of a given type (e.g., 25). A remote computing device 42 can interface with the remote server 40 over network 15 in order to add data, edit data, perform calculations, run reports or otherwise manipulate data as it is collected and processed in accordance with the present disclosure. Network 15 can be one or more networks including WiFi and cellular networks, for example.

The remote server 40 can include a remote server processor and a remote server memory storing instructions that when executed by the remote server processor perform functions and routines as described herein. For example, a sensor monitoring component 52 can operate to receive sensor measurements from one or more sensors onboard the aircraft 20, 25. As described elsewhere herein and in various embodiments, the sensors onboard the aircraft can include or consist of non-traditional atmospheric sensors. For example, while the onboard sensors can be dedicated atmospheric sensors for taking measurements such as temperature, humidity, pressure, wind and other measurements, embodiments of the present disclosure operate with non-traditional atmospheric sensors such as may be employed for flight control, mission management and/or propulsion control, for example. In this way, these embodiments reduce or eliminate added weight, cost, power draw or other potentially disadvantageous factors to the payload of aircraft employed with the system 10.

As further shown in FIG. 1, the remote server 40 can include an independent observation monitoring component 54, which can receive measurements from various independent measurement sources 46 such as a weather balloon, weather satellites, ground-based LIDAR, dedicated onboard weather sensors and numerical weather prediction models. It will be appreciated that the independent measurement sources 46 can include sources onboard the vehicle. The remote server 40 can further include a system/parameter identification component 56, model selection component 58, model error characterization component 60, flight regime recognition component 62, uncertainty quantification component 64 and wind estimation component 66. All components described herein as part of the remote server 40 can communicate with one another and can store programming instructions that when executed by the remote server processor perform functions and routines as described herein.

Figure 2:
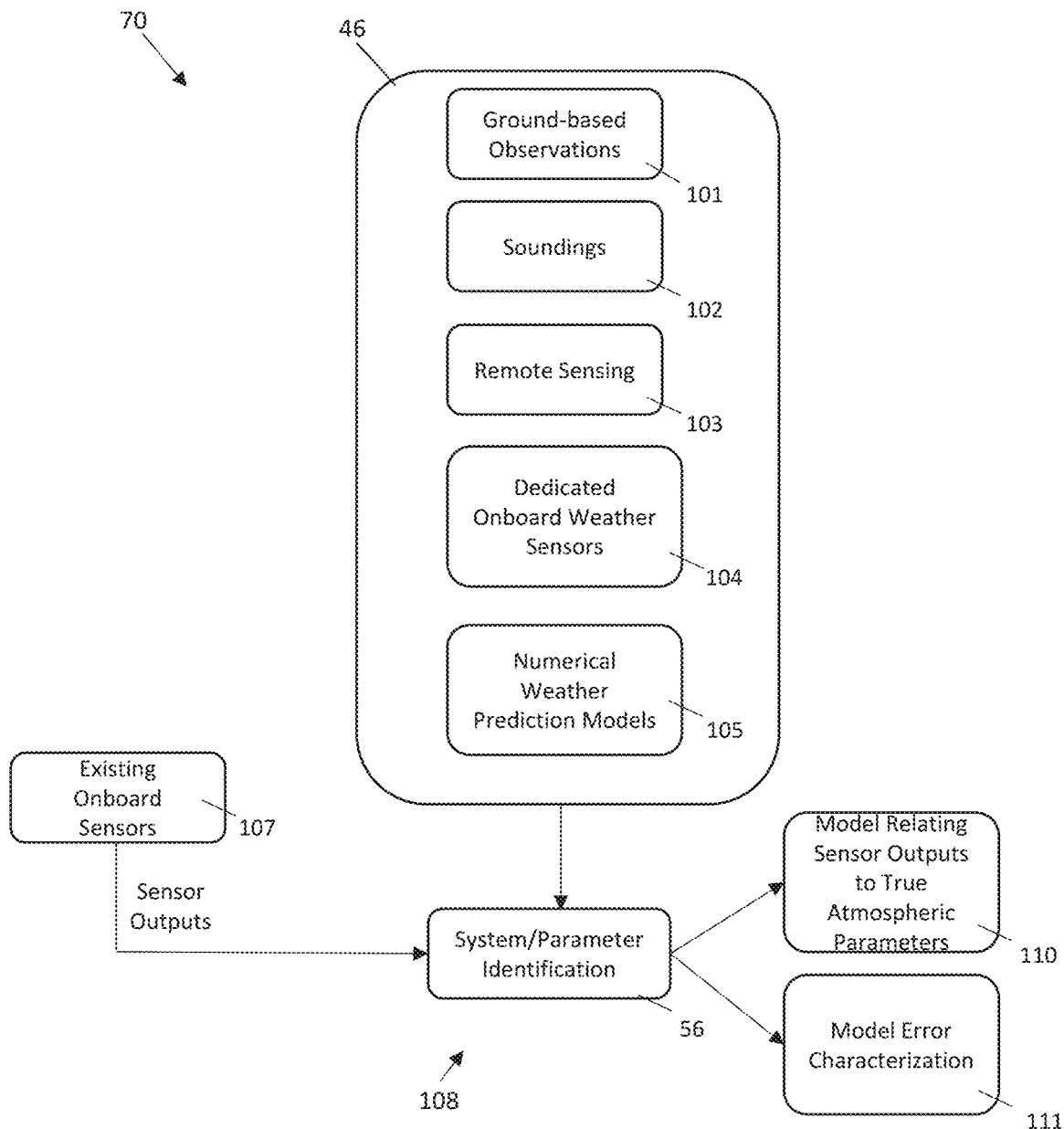
FIGS. 2 through 8 illustrate exemplary process flows for various method in accordance with embodiments of the present disclosure.

FIG. 2 illustrates an embodiment of a process 70 for generating models that relate raw sensor outputs to true atmospheric parameters in accordance with the present disclosure. As shown therein, the process 70 employs independent measurements of atmospheric parameters of interest from one or more independent measurement sources 46, which may include ground based observations 101 such as from a ground-based LIDAR, soundings 102 such as from a weather balloon, observations from remote sensors 103 such as weather satellites, data from dedicated weather sensors 104 onboard the vehicle that may be temporary sensors added for the system/parameter identification process, and data from numerical weather prediction models 105. For various reasons, these independent measurements may be suitable for system/parameter identification but not as suitable for routinely gathering the atmospheric data that the present disclosure can generate using existing onboard sensors, i.e., non-traditional atmospheric sensors. For example, some types of independent measurements, e.g., some types of ground-based measurements and soundings, are impractical to collect at high spatial and temporal resolution but can be collected in limited regions to support model generation. Remote measurements with satellites may be useful for model calibration when large quantities of data are available but lack the spatial and/or temporal resolution that can be provided according to the present disclosure. Adding dedicated onboard atmospheric sensors may be acceptable temporarily for model development, but impose unacceptable size, weight, power, and cost burdens for routine use by a large fleet.

The independent atmospheric measurements 46, which can be collected during one or multiple flight operations are combined with the outputs of the existing onboard sensors as indicated at 107, and this information is supplied to a system/parameter identification component 56 as at 108. In some embodiments, the system/parameter identification component 56 identifies a model structure as well as a set of parameters in that model. In some embodiments, an appropriate model structure may be selected or established via model selection component 58 (FIG. 1) based on prior research or may be derived from knowledge of the system design of other known principles, and the system/parameter identification component 56 identifies only the parameters in that known model structure. In some embodiments, prior knowledge of an appropriate model structure can reduce the data required to achieve the desired model accuracy. The results of the system/parameter identification processing performed by the system/parameter identification component 56 can include a model as indicated at 110 relating the sensor outputs to the true atmospheric parameters. This may be a model that uses current observations to estimate current atmospheric parameters, or a model that uses a time sequence of past and current observations to estimate current atmospheric parameters. In various embodiments, as part of the process 70 in FIG. 2, the model error characterization component 60 (FIG. 1) can produce a model error characterization as indicated at 111, which may include a characterization of the uncertainty in model parameters and may include a characterization of errors in the model structure such as unmodeled system dynamics, for example. In various embodiments, a model relating raw sensors outputs to atmospheric parameters may be applicable only to a specific type of aircraft.

Figure 3:
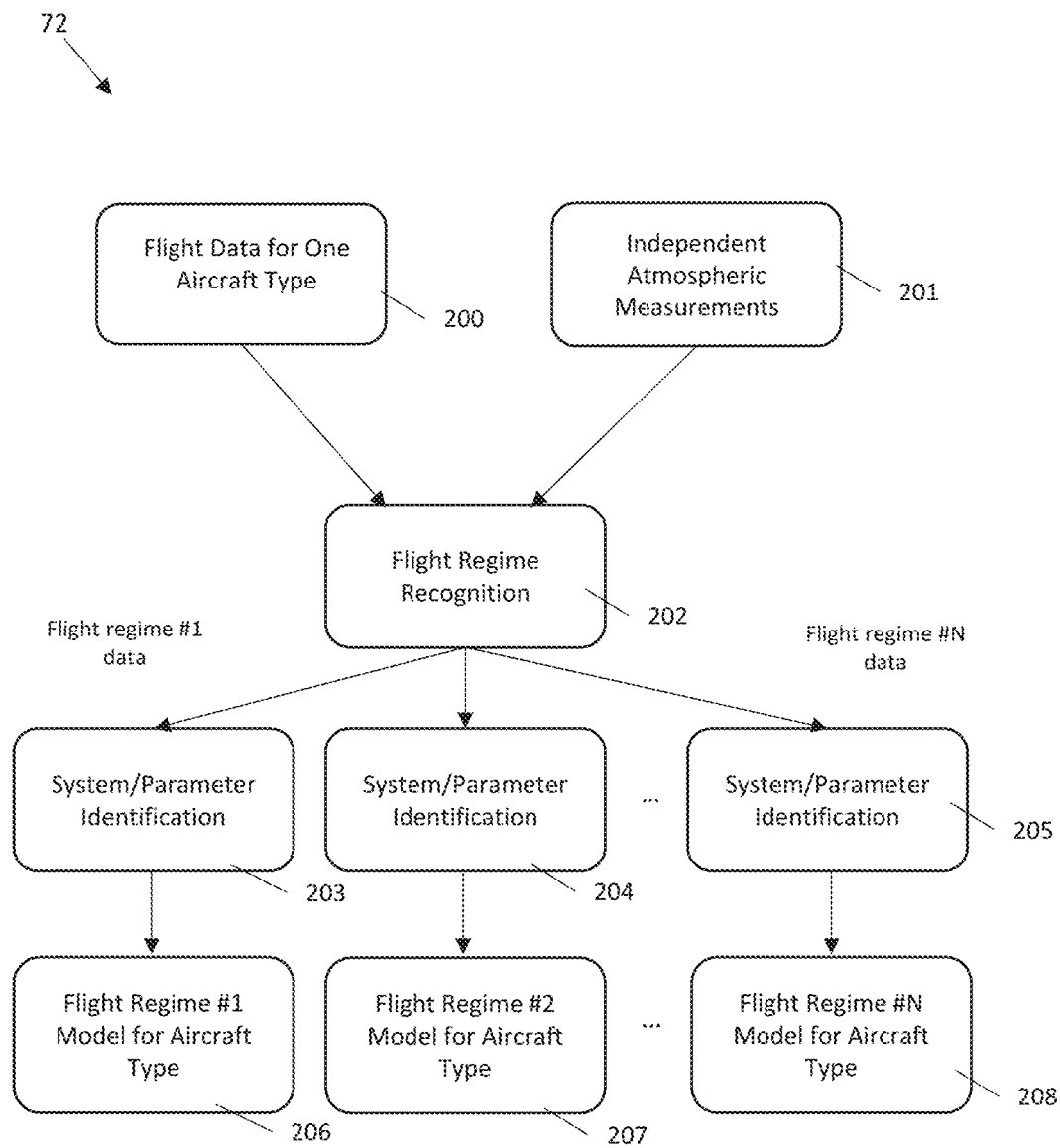

In some embodiments, the model relating sensor outputs to atmospheric parameters of interest as indicated at 110 in FIG. 2 may comprise multiple sub-models valid in different flight regimes, as shown in FIG. 3. In the process 72 of FIG. 3, data is collected for one type of aircraft as at 200 and may include data from multiple vehicles of that type (e.g., as illustrated by multiple vehicles 25 in FIG. 1). Independent atmospheric measurements 201, which may come from one or more of the sources 46 shown in FIGS. 1 and 2, are collected during the same time period to yield a set of data suitable for system/parameter identification. Some embodiments include estimation of the air velocity which may be considered a combination of steady wind, turbulence, and discrete gusts, for example. In some embodiments, a model of the air vehicle dynamics may be used to relate aircraft motions observed by the existing onboard sensors to the air velocity. In these embodiments, the selected subset of data may be data from calm air conditions, and maneuvers executed by the vehicle may provide a range of relative wind conditions (that is different directions of air motion relative to the vehicle) used to construct a model. In some embodiments, the subset of data used for system/parameter identification will include all available data. As at 202, the flight regime recognition component 62 (FIG. 1) can apply a flight regime recognition algorithm to partition the available data into different flight regimes. The definitions of the flight regimes modeled may be determined automatically by the modeling algorithms according to the present disclosure or may be specified by a human based on knowledge of the vehicle and operational characteristics. A flight regime may include a limited range of vehicle airspeeds, altitudes, and angles of attack, and may include limited ranges of atmospheric conditions including temperature, pressure, and humidity, for example. The system/parameter identification component 56 can be employed independently for each flight regime as at 203, 204 and 205 and different approaches may be used for different regimes. The system/parameter identification component 56 produces a set of models as indicated at 206, 207 and 208, each of which is valid for a specific flight regime and the specific aircraft type. For instance, a first set of atmospheric parameter values can be identified for a first flight regime and a second independent set of atmospheric parameter values can be identified for a second flight regime. In various embodiments, the set of flight regimes for which system/parameter identification is performed may not span all of the regimes in which the vehicle operates. For example, a vertical takeoff and landing (VTOL) aircraft that is also capable of wingborne flight may transition between hovering operations and wingborne flight and these transitions may involve complex dynamics that are difficult to model, and may only comprise a small portion of a typical flight. Such transitions may not be included in any of the flight regimes for which models are developed according to various embodiments of the present disclosure.

Figure 4:
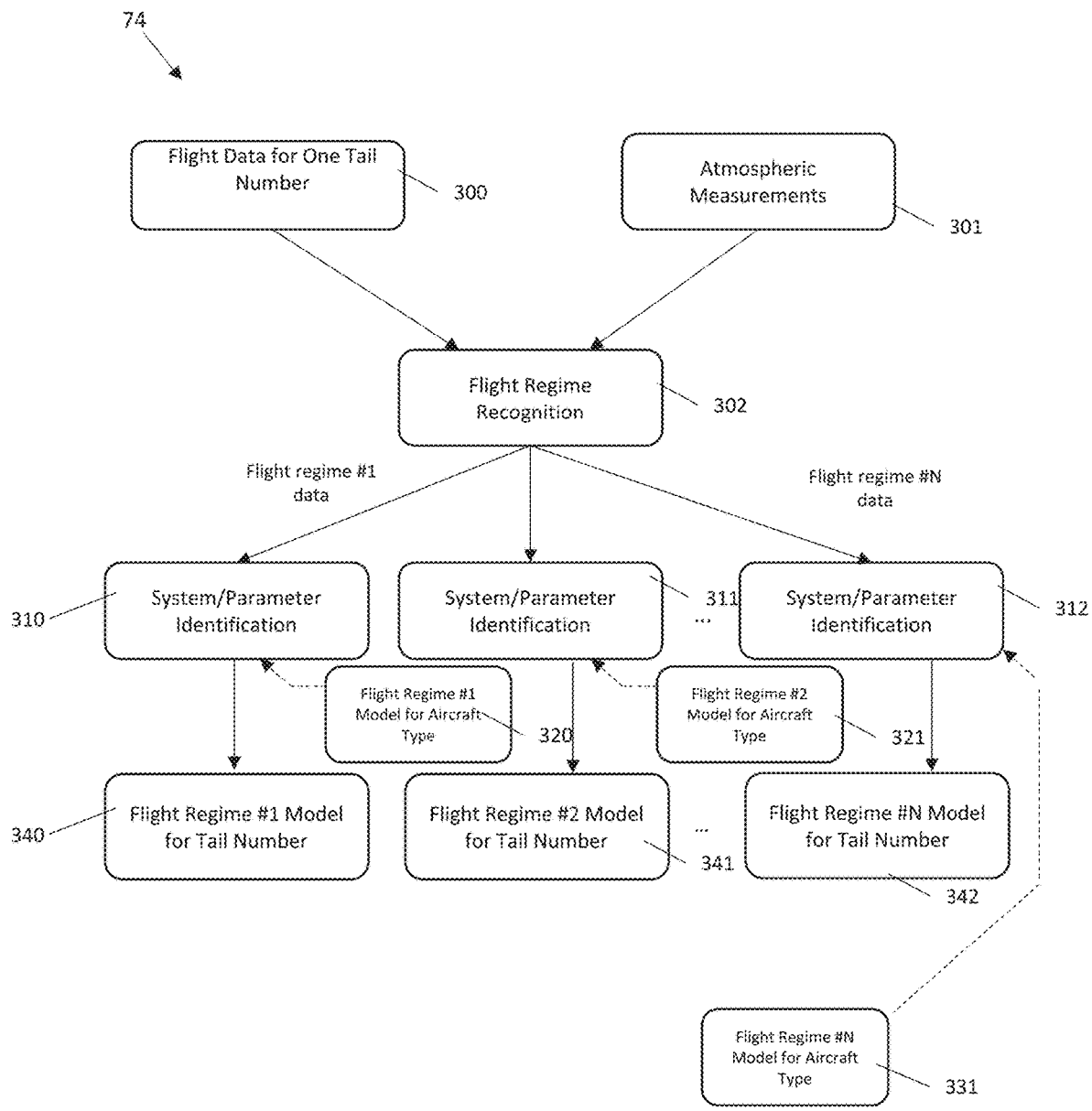

In some embodiments, models are constructed for specific vehicles, which are uniquely identified by a tail number, to capture the differences among aircraft of the same type. FIG. 4 depicts a process 74 according to the present disclosure of developing a model for a specific tail number. Flight data for the specific tail number as indicated at 300 is collected during the same period of time as atmospheric measurements indicated at 301, which include independent atmospheric measurements (as indicated at 201 in FIG. 2) and may include estimates based on existing onboard sensors and models, which may be models produced by the process shown in FIG. 3, for example. As at 302, the flight regime recognition component 62 follows a similar procedure as described in connection with FIG. 3, partitioning the data into multiple flight regimes. System/parameter identification component 56 is employed for each flight regime as indicated at 310, 311 and 312 using the data for each flight regime to produce a unique model as indicated at 340, 341 and 342, respectively, for the specific tail number and the specific flight regime. In some embodiments, the system/parameter identification component 56 may utilize a model for the aircraft type as indicated at 320, 321 and 331, respectively, for each flight regime such as a model produced by the process 72 in FIG. 3. In some embodiments, when a prior model for the aircraft type is available, then the system/parameter identification component 56 will update parameters but not change the model structure at 310, 311 and 312. In some embodiments, when a prior model for the aircraft type is available then the system/parameter identification component 56 will assess the accuracy using the existing model structure and update the structure only if the accuracy does not meet a desired and/or pre-determined threshold.

Figure 5:
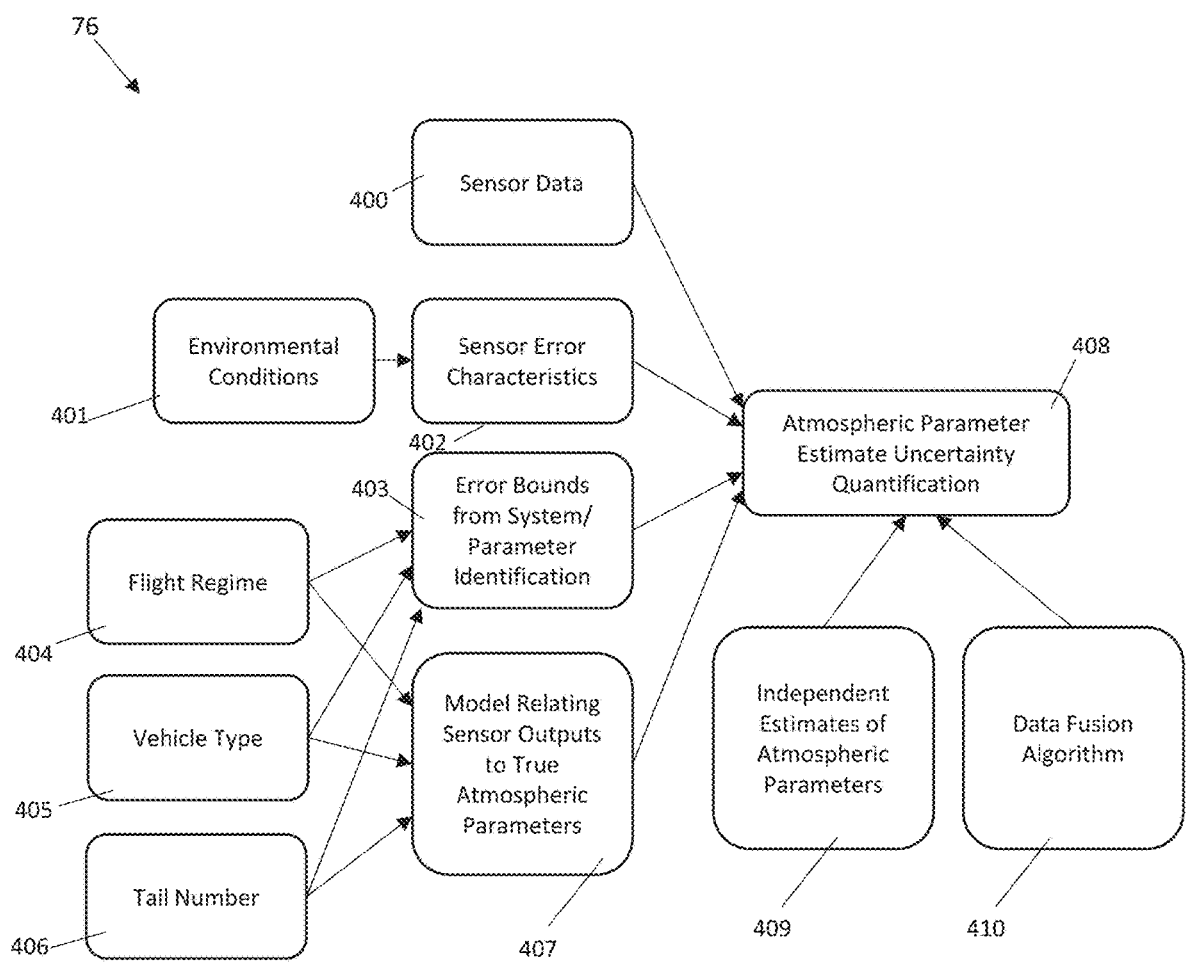

It will be appreciated that quantification of uncertainty in the atmospheric parameter estimates can be very helpful to making appropriate use of these estimates. FIG. 5 depicts a process 76 for quantifying this uncertainty. In the exemplary process 76, the uncertainty quantification component 64 (FIG. 1) receives inputs to the uncertainty quantification as at 408 including raw sensor data as at 400, sensor error characteristics as at 402, error bounds from the system/parameter identification process as at 403 and the model relating sensors outputs to true atmospheric parameters as at 407. Independent estimates of atmospheric parameters as at 409 and a data fusion algorithm 410 can be employed in the uncertainty quantification. In some embodiments, the estimate of atmospheric parameter uncertainty may be based solely on the distribution of differences between estimate of atmospheric parameters based on the model relating sensor outputs to true atmospheric parameters and the independent estimates of atmospheric parameters. In some embodiments, the data fusion algorithm 410 may employ stochastic modeling tools to solve a set of stochastic differential equations to characterize the uncertainty in atmospheric parameter estimates based on sensor data 401, sensor error characteristics 402, error bounds 403, and the model 407. In the latter embodiments, the differences between estimate of atmospheric parameters based on the model relating sensor outputs to true atmospheric parameters and the independent estimates of atmospheric parameters may be used to validate the outputs of the data fusion algorithm. In some embodiments, the sensors error characteristics will depend on certain environmental conditions as at 401 such as temperature. These environmental conditions may relate to parameters of the ambient atmosphere surrounding the vehicle or may relate to the local environment in which the sensor is operating such as the temperature inside an enclosure where a sensor is housed. Sensor characteristics may be available from data sheets, laboratory testing, or may be estimated as part of the system/parameter identification process described elsewhere herein. Error bounds from the system/parameter identification process as indicated at 403 and the model relating sensor outputs to true atmospheric parameters as at 407 may depend on the flight regime as at 404, the vehicle type as at 405, and the tail number as at 406. In some embodiments, an uncertainty representation approach may be used that allows a wide variety of distributions to be represented to more accurately capture various sources of uncertainty impacting the atmospheric parameter estimates. In some embodiments, models of uncertainty in the atmospheric parameter estimates may be produced by explicitly propagating uncertainties in various system inputs and parameters through the model relating sensors outputs to true atmospheric parameters. In some embodiments, the generalized Polynomial Chaos uncertainty representation framework may be used to represent and mathematically propagate uncertainties.

Figure 6:
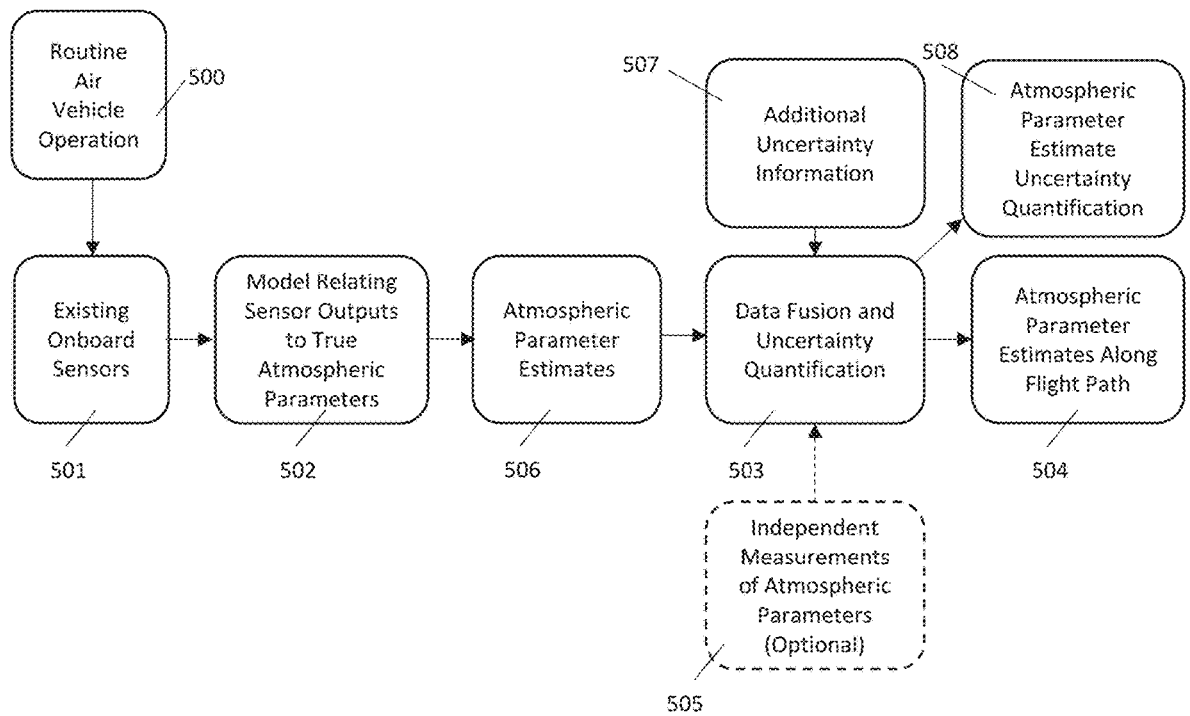

FIG. 6 depicts an exemplary process 78 for the operational use of embodiments of the present disclosure in the context of a single flight operation of a single air vehicle as indicated at 500 during which data is collected by the existing onboard sensors as at 501 and supplied to the model relating sensor outputs to true atmospheric parameters as at 502. The model indicated at 502 may be a general model for the vehicle type, or a model calibrated to the specific tail number, for example, as described elsewhere herein. The model may be composed of multiple sub-models as depicted in FIGS. 3 and 4, for example. The model outputs atmospheric parameter estimates as at 506 and in some embodiments also outputs uncertainty information. The inputs to the data fusion and uncertainty quantification component 64 as indicated at 503 comprise the outputs of the model 502, optionally the independent measurements of atmospheric parameters 505, and additional uncertainty information as indicated at 507, and as detailed in FIG. 5 and the related description. The data fusion and uncertainty quantification at 503 can output atmospheric parameter estimates along the flight path of the vehicle as at 504 and associated uncertainty measures as at 508.

Figure 7:
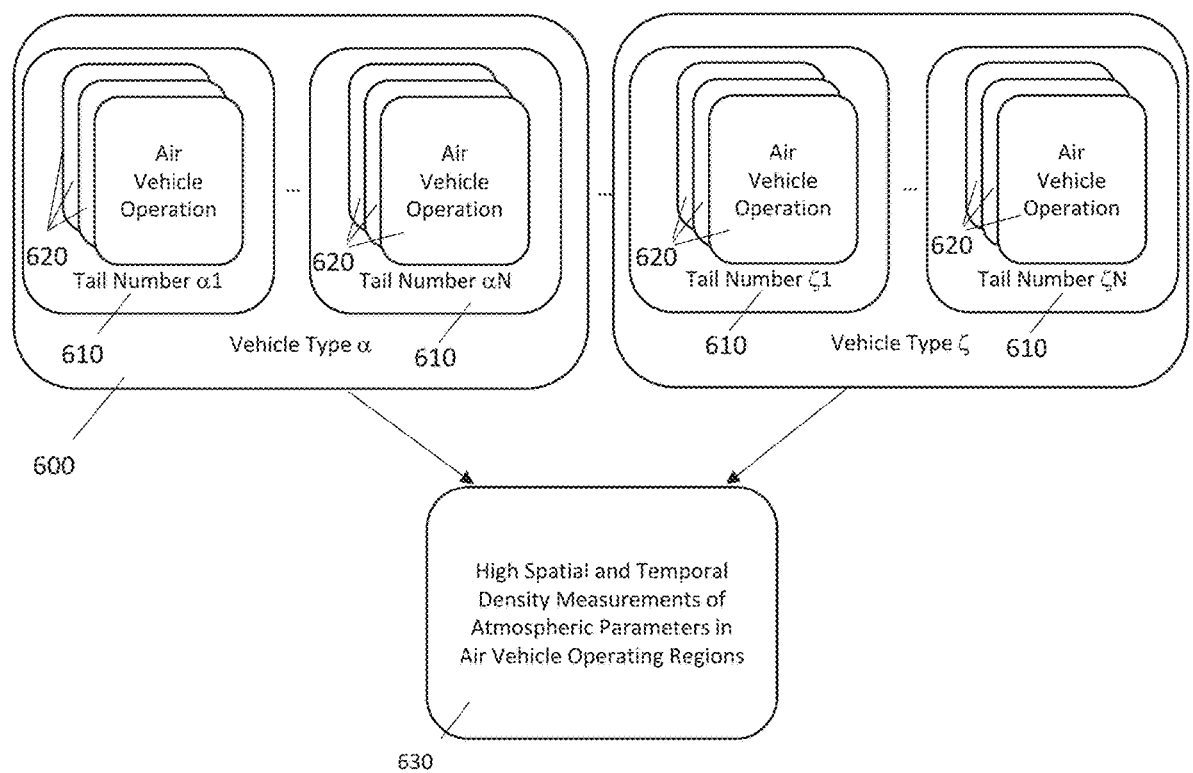

FIG. 7 depicts an embodiment of the present disclosure deployed on a heterogeneous fleet of air vehicles for routine use. This embodiment may be deployed on multiple types of vehicles such as vehicle type a as indicated at 600 and vehicle type C as indicated at 601, and for each type of vehicle may be deployed on multiple tail numbers as indicated at 610. Each individual aircraft will typically conduct repeated operations as indicated at 620. In some embodiments, all air vehicle operations will be routine operations of the air vehicles primarily for purposes other than atmospheric sensing (e.g., for cargo delivery, passenger transport, infrastructure inspection, crop inspection or other routine operation). In some embodiments, air vehicle operations may be conducted primarily for the purpose of atmospheric sensing to augment data available from routine operations. In some embodiments, dedicated vehicles may be used to conduct operations primarily for the purpose of atmospheric sensing. In a system such as an urban air mobility system with very high-density routine operations, these routine operations will often provide the desired spatial and temporal sampling density. However, even for a system in which routine operations are normally conducted at high densities, some conditions such as adverse weather will reduce the number of routine operations. Air vehicle operations primarily for the purpose of atmospheric sensing may be conducted to provide data prior to the resumption of routine operations. Such dedicated flights may use vehicles that are more robust to adverse weather conditions. Such dedicated flights may also use small, lightweight vehicles to mitigate the hazards posed by the air vehicle operations, including hazards to people and property on the ground.

Figure 8:
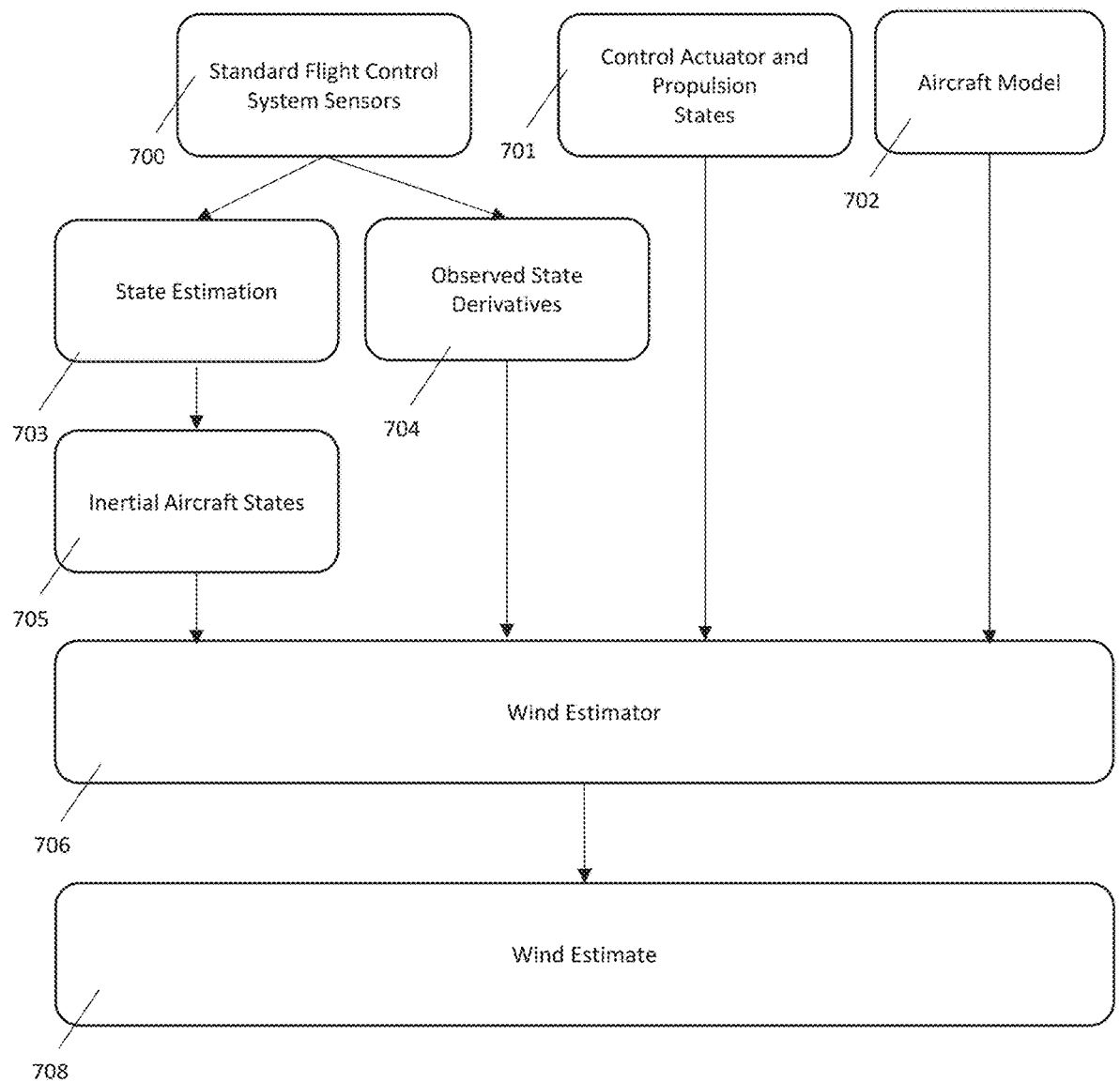

FIG. 8 depicts a specific case of employing the wind estimation component 66 of the present disclosure to estimate winds. These embodiments employ inputs including data from standard flight control sensors as at 700, control actuator and propulsion states as at 701, which may be measured such as with a position sensor or RPM sensor or may be computed based on commanded values, and a model of the aircraft dynamics as at 702. In some embodiments, the model of aircraft dynamics is generated based on flight data as described in connection with FIGS. 2 through 4. In some embodiments, a previously developed model may be used by the system such as a model based on wind tunnel test, computational fluid dynamics results, and/or flight test data. Based on the outputs of the sensors at 700, a state estimator component (indicated at 703) of the wind estimation component 66 produces estimates of the inertial aircraft states as at 705. The sensors as at 700 may also provide direct measurements of state derivatives as at 704 including translational accelerations. The wind estimation component 66 can employ the various inputs as at 706 to produce one or more estimates of wind velocity as at 707. In some embodiments, the wind estimation component 66 computes an estimate of winds to minimize the difference between the observed vehicle accelerations and the accelerations predicted by the aircraft model based on the inertial states and the wind estimate.

With regard to model selection, it will be appreciated that embodiments of the present disclosure can operate with a wide variety of models and model structures. For example, model selection can occur as described below.

Let $y(t) \in \Re^n$ be a set of atmospheric parameters of interest at time t, for example, $\Re$ $$y(t) = \begin{bmatrix} \text{Pressure} \\ \text{Temperature} \\ \text{Humidity} \\ \text{Wind Direction} \\ \text{Wind Speed} \end{bmatrix}$$

Let $u(t) \in \Re^m$ be a set of onboard measurements comprising measurements from non-traditional atmospheric sensors at time t, for example $$u(t) = \begin{bmatrix} \text{longitudinal acceleration} \\ \text{lateral acceleration} \\ \text{vertical acceleration} \\ \text{roll rate} \\ \text{pitch rate} \\ \text{yaw rate} \\ \text{longitudinal magnetic field strength} \\ \text{lateral magnetic field strength} \\ \text{vertical magnetic field strength} \\ \text{longitudinal velocity} \\ \text{lateral velocity} \\ \text{vertical velocity} \\ \text{dynamic pressure} \\ \text{static pressure} \\ \text{temperature at autopilot location} \end{bmatrix}$$

Embodiments of the present disclosure select from a set of candidate models a model that accurately captures the relationship between y(t) and u(t). Candidate model structures may include a linear model in which y is a function only of current observations, i.e., $$y(t) = B(t)u(t)$$

where $B(t) \in \Re^{n \times m}$ is a matrix of real-valued coefficients that may or may not vary with time.

Candidate model structures may also include a linear model in which y is a function of observations from a finite number of times, i.e., $$y(t) = B_0(t)u(t_0) + B_1(t)u(t_1) + \ldots + B_i(t)u(t_i)$$

where $B_0(t), B_1(t), \ldots B_1(t) \in \Re^{n \times m}$ are matrices of real-valued coefficients that may or may not vary with time and $t_0, t_1, \ldots t_i$ may include time t, times before t, and times after t.

Candidate model structures may also include a dynamic linear model $$\dot{x}(t) = A(t)x(t) + B(t)u(t)$$

$$y(t) = C(t)x(t) + D(t)u(t)$$

where $A(t) \in \Re^{p \times p}$, $B(t) \in \Re^{p \times m}$, $C(t) \in \Re^{n \times p}$, $D(t) \in \Re^{n \times m}$ are matrices of real-valued coefficients that may or may not vary with time, and $x(t) \in \Re^p$ is a state vector.

Candidate model structures may also include static or dynamic models with arbitrary nonlinearities. For example, candidate model structures may include $$\dot{x}(t) = h(x(t), u(t), t)$$

$$y(t) = g(x(t), u(t), t)$$

where h( ) and g( ) may include arbitrary nonlinearities.

In some embodiments, $u(t) \in \Re^m$ may comprise a set of onboard measurements from non-traditional atmospheric sensors and a set of measurements from other sensors that may include traditional atmospheric sensors onboard the vehicle and sensors remote to the vehicle.

It will thus be appreciated that the system, device and method as described herein can operate so as to collect and/or receive a set of independent measurements of atmospheric parameters of interest, collect and/or receive a set of onboard measurements comprising measurements from a non-traditional atmospheric sensor, wherein the collected onboard measurements may be collected during multiple flight operations of a single or multiple vehicles. The set of onboard measurements can include measurements from multiple non-traditional atmospheric sensors, and the vehicle from which the measurements are received can be one or more vehicles, either of different types, of the same type, or of both different and the same types. Further operations as described herein can include processing, by the system/parameter identification component, the collected set of independent measurements and the collected set of onboard measurements to identify selected atmospheric parameters and generating, based on the selected atmospheric parameters and the collected set of onboard measurements, a model for relating raw sensor outputs from the non-traditional atmospheric sensors to the atmospheric parameters of interest. Estimates of atmospheric parameters of interest can then be generated for use in the operation of one or more active vehicles in real-time as well for the operation of one or more vehicles in the future.

It will be appreciated that the first set of independent measurements of atmospheric parameters of interest can include ground-based observations, soundings, observations from remote sensors, data from dedicated weather sensors onboard the vehicle, and data from numerical weather prediction models. Further, the ground-based observations and observations from remote sensors may be overlapping sets. It will further be appreciated that generating the model can include selecting a model structure from among multiple available model structures as described above. Selecting the model structure is separate from selecting the values of the parameters to go into the model structure, and both aspects are involved in the processing performed by the system/parameter identification component.

In generating the model, embodiments of the present disclosure can also generate a characterization of uncertainty in the model as described above. The generated model can use current observations from the non-traditional atmospheric sensor to estimate current atmospheric parameters. Further, the generated model can use a time sequence of past and current observations from the non-traditional atmospheric sensor to estimate current atmospheric parameters.

As described elsewhere herein, embodiments of the present disclosure also operate to apply, prior to the processing of the collected measurements, a flight regime recognition algorithm to partition the collected measurements into first and second flight regimes. It will be appreciated that processing the collected measurements can include processing the collected measurements to identify a first set of selected atmospheric parameter values for the first flight regime and processing the collected measurements to identify a second set of selected atmospheric parameter values for the second flight regime. It will further be appreciated that generating the model can include employing a first model associated with the first regime and employing a second model associated with the second regime. The first and second flight regimes can correspond to different ranges of vehicle airspeeds, different ranges of vehicle altitudes and/or one or more vehicle configurations. Further, the generated model can be specific to an individual flight vehicle and/or an individual flight vehicle type.

EXAMPLE IMPLEMENTATIONS

An example implementation of embodiments of the present disclosure can involve an air vehicle such as a small multi-copter vehicle equipped with a basic autopilot system including one or more three-axis accelerometers, one or more three-axis magnetometers or compasses, one or more three-axis rate gyroscopes, one or more barometric pressure sensors, one or more temperature sensors, and one or more GPS receivers. Flight data is first collected that may include data from routine operations of the air vehicle and may include data from flights dedicated to system/parameter identification. Dedicated flights can be conducted in conditions with minimum wind and turbulence. A subset of data from routine flight operations can be identified that comes from operations in conditions of minimum wind and turbulence, which will be identified based on forecast conditions from sources that may include numerical weather prediction models and observed weather conditions from sources that may include ground-based weather observation stations, weather balloons, and weather satellites, for example.

Using the sensor outputs and an appropriate state estimation approach, estimates of the earth-relative vehicle position, orientation, translational velocities and accelerations, and rotational velocities and accelerations can be generated. In calm air conditions, the motions of the vehicle relative to the airmass are the same as the motions of the vehicle relative to the earth. A model of the air vehicle dynamics and the aerodynamic characteristics of the vehicle can thus be developed based on the available information and as described elsewhere herein. This model will relate vehicle accelerations to parameters including the translational and rotational velocities of the vehicle relative to the airmass, and the commands to the motors. If measurements of the motor RPM are available, then accelerations may be modeled as a function of motor RPM rather than motor command, according to some embodiments. Modeling as a function of motor RPM may generally be desirable if rotor RPM measurements are available as it reduces the complexity of the required models, which in that case do not need to capture the potentially complex relationship between motor commands and achieved motor RPM. In some embodiments, measurements of RPM are available from electronic motor control devices and are logged by the flight control system for the air vehicle. Vehicles models can be developed for specific operating conditions such as hover in ground effect, hover out of ground effect, level forward flight at one or more airspeeds, and steady rate climbs and descents at airspeeds and climb rates typical for the vehicle. Each vehicle model may be valid over a range of conditions around the selected operating condition, and the set of operating conditions can be selected to yield a set of models that provides coverage of a large portion of typical missions.

In operation, calm air conditions will frequently not prevail, and the air motions will contribute to the translational and rotational accelerations of the vehicle. Based on the measured vehicle accelerations, the model of the air vehicle dynamics and the aerodynamic characteristics of the vehicle, and the estimates of the earth-relative vehicle position, orientation, translational velocities and accelerations, and rotational velocities and accelerations, estimates of the translational and rotational wind velocities in three axes can be computed as described elsewhere herein. The computed wind velocities will be those that minimize the error between the measured accelerations and the accelerations predicted by the model when using total velocity of the vehicle relative to the airmass (which is a function of the velocity of the vehicle relative to the earth and the velocity of the airmass relative to the earth) for computing aerodynamic forces and moments.

In one embodiment of the system, temperature and barometric pressure sensors are physically located on the autopilot circuit board, which is enclosed in a protective shroud. As a consequence, these sensors are not directly exposed to air at the ambient pressure and temperature. The temperature and pressure at the sensor location may lag the ambient pressure and temperature significantly as the shroud slows the exchange of air between the cavity around the autopilot and the external environment in which the vehicle is operating. The temperature at the sensor location may also be impacted by other vehicle components, such as a battery pack that may release heat as energy is drawn from the pack, or power electronics that may dissipate heat. The pressure at the sensor location may be impacted by airflow around the vehicle, including flow due to the motion of the vehicle through the air, and flow induced by the propellors. The relationship between ambient temperature and pressure, vehicle motions relative to the airmass, and the sensed temperature and pressure can be modeled based on experimental data. Flight data can be collected either during routine operations or during dedicated flights for model development purposes. The motion of the vehicle relative to the airmass can be established either by using dedicated flights in calm air conditions as described above, or by leveraging the wind estimates generated according to the present disclosure, both in conjunction with measurements from the vehicle sensors and a state estimation algorithm as described herein. These embodiments will then identify a model relating the measured temperature and pressure to the ambient temperature and pressure, vehicle motion relative to the airmass, and potentially other atmospheric and/or vehicle parameters. In some cases, these embodiments will produce a dynamic model, and in some cases in which the lag between changes in ambient atmospheric conditions and sensors readings are minimal a static model may be generated.

In some embodiments, a multi-copter vehicle such as that described above carries an optical camera, e.g., for collision avoidance, for landing site selection and/or navigation to a landing site, or as a payload sensor to perform tasks such as aerial inspection. Such a camera may be leveraged in conjunction with the vehicle location, known features of the environment such as building locations and terrain elevation, and appropriate image processing algorithms to estimate visibility either vertically or horizontally.

In another exemplary embodiment, an air vehicle such as a passenger-carrying distributed-electric-propulsion vertical take-off and landing vehicle is employed. Such an air vehicle can be capable of operating as a multi-copter vehicle for hover and low speed flight and transitioning to a wing-borne flight mode for high speed flight. The vehicle is equipped with an autopilot system including one or more three-axis accelerometers, one or more three-axis magnetometers or compasses, one or more three-axis rate gyroscopes, one or more air data systems comprising one or more static pressure sensors, one or more dynamic pressure sensors, one or more exterior temperature sensors and one or more GPS receivers. Model construction will generally involve the same procedure as described above for the case of the pure multi-copter vehicle. For this vehicle, embodiments of the present disclosure will construct a set of models for different combinations of vehicle configuration and flight conditions, with the models collectively providing coverage of a large portion of a typical flight operation. Models may, but will not necessarily, provide coverage of flight segments involving transitions between hover and wing-borne flight that involve complex and rapidly changing dynamics. In this embodiment, additional data is leveraged from the air data system that is not typically available for a small multi-copter vehicle. In high-speed wing-borne flight, the dynamic pressure sensor provides a measurement directly related to the velocity of the vehicle relative to the airmass in the longitudinal direction. In hovering and low-speed flight, the measurements from the dynamic pressure sensor will be dominated by propulsion effects. Both the static and dynamic pressure measurements will also include systematic errors associated with the mounting locations and the impacts of the air vehicle on the local airflow, which will be a function of flight condition. In this embodiment, flight data from calm air conditions is used in conjunction with independent measurements of atmospheric parameters as discussed above to model the relationship among the measured static and dynamic pressure, the ambient atmospheric pressure, and the true airspeed.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, as exemplified above. The program code may execute entirely on a user's computer, partly on a user's computer, as a stand-alone software package, partly on a user's computer and partly on a remote computer or entirely on the remote computer or server. The user's computer and/or the remote computer may be onboard an aircraft or not, depending upon the specific embodiment involved. In the latter scenario, the remote computer (e.g., 40 in FIG. 1) may be connected to a user's computer (e.g., 42 in FIG. 1) through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Where databases are described or implied in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "system" as used herein refers to various configurations of: (a) one or more servers (e.g., 40), central controllers, or remote hosts; (b) one or more personal computing devices (e.g., 42), such as desktop computers, laptop computers, tablet computers or computing devices, personal digital assistants, mobile phones, and other mobile computing devices; (c) one or more independent measurement sources (e.g., 46); and/or (d) one or more air vehicles (e.g., 20, 25). A system as used herein may also refer to: (e) a single server, central controller, or remote host; and/or (f) a plurality of servers, central controllers, or remote hosts in combination with one another. A system as used herein may also refer to: (g) a single server, central controller, or remote host in communication with another device (e.g., 42, 46 and/or 20/25); and/or (h) a plurality of servers, central controllers, or remote hosts in combination with another device (e.g., 42, 46 and/or 20/25).

In certain embodiments in which the system includes a server, central controller, or remote host, the server, central controller, or remote host is any suitable computing device (such as a server) that includes at least one processor and at least one memory device or data storage device. The processor of the server, central controller, or remote host is configured to transmit and receive data or signals representing events, messages, commands, or any other suitable information between the server, central controller, or remote host and the additional device.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

The invention claimed is:

1. A method, comprising:
collecting a set of independent measurements of atmospheric parameters of interest, wherein the first set of independent measurements of atmospheric parameters of interest comprise at least one of: ground-based observations, soundings, observations from remote sensors, data from dedicated weather sensors onboard a vehicle, and data from numerical weather prediction models;

collecting a set of onboard measurements comprising measurements from a non-traditional atmospheric sensor onboard a UAV collected during flight operations of the UAV, wherein the non-traditional atmospheric sensor comprises at least one of: an accelerometer, a gyroscope, a magnetometer, a GPS receiver and a motor RPM sensor;

generating by a system parameter identification component, based on the set of independent measurements and the set of onboard measurements, a model for relating raw sensor outputs from the non-traditional atmospheric sensors to the atmospheric parameters of interest;

generating, using the model, atmospheric parameter estimates; and employing the atmospheric parameter estimates in the operation of the UAV, wherein employing the atmospheric parameter estimates comprises transmitting a command for maneuvering the UAV.

2. The method of claim 1, wherein the set of onboard measurements comprises measurements from a plurality of non-traditional atmospheric sensors onboard the air vehicle and wherein the plurality of non-traditional atmospheric sensors comprises at least two of: the accelerometer, the gyroscope, the magnetometer, the GPS receiver and the motor RPM sensor.

3. The method of claim 1, wherein generating the model comprises selecting a model structure from among a plurality of available model structures and selecting parameter values for the selected model structure.

4. The method of claim 1, further comprising generating a characterization of uncertainty in the model.

5. The method of claim 1, wherein the model uses current observations from the non-traditional atmospheric sensor to estimate current atmospheric parameters.

6. The method of claim 1, wherein the model uses a time sequence of past and current observations from the non-traditional atmospheric sensor to estimate current atmospheric parameters.

7. The method of claim 1, further comprising applying, prior to the processing of the collected measurements, a flight regime recognition algorithm to partition the collected measurements into first and second flight regimes, and further wherein:

the processing of the collected measurements comprises processing the collected measurements to identify a first set of selected atmospheric parameter values for the first flight regime and processing the collected measurements to identify a second set of selected atmospheric parameter values for the second flight regime;

the generating of a model comprises employing a first model associated with the first regime and employing a second model associated with the second regime; and the first and second flight regimes define the altitude, angle of attack, pressure, temperature, humidity or speed over which the first model and the second model are valid.

8. The method of claim 7, wherein the first and second flight regimes correspond to different vehicle configurations.

9. The method of claim 7, wherein the first and second flight regimes correspond to different ranges of vehicle airspeeds.

10. The method of claim 7, wherein the first and second flight regimes correspond to different ranges of vehicle altitudes.

11. The method of claim 7, wherein the first and second flight regimes correspond to different ranges of vehicle airspeeds, different ranges of vehicle altitudes and a vehicle configuration.

12. The method of claim 1, wherein the generated model is specific to an individual flight vehicle.

13. The method of claim 1, wherein the generated model is specific to a flight vehicle type.

14. The method of claim 1, wherein the set of onboard measurements comprises measurements from non-traditional atmospheric sensors onboard a plurality of UAVs of a first flight vehicle type collected during multiple flight operations of the plurality of UAVs.

15. A distributed atmospheric sensing system, comprising:

a UAV comprising sensors adapted for flight control and propulsion and not adapted for atmospheric measurements, wherein the sensors comprise at least one of: an accelerometer, a gyroscope, a magnetometer, a GPS receiver and a motor RPM sensor;

a processor; and a memory storing a plurality of instructions which, when executed by the processor, cause the processor to:

receive sensor measurements from the sensors;

apply a model relating the sensor measurements to atmospheric parameters of interest, wherein the model is generated by applying a system/parameter identification component to selected atmospheric parameters, outputs of the sensors adapted for flight control and propulsion and not adapted for atmospheric measurements, and independent measurements of atmospheric parameters of interest; and generate atmospheric parameter estimates and employ the atmospheric parameter estimates in the operation of the UAV, wherein employing the atmospheric parameter estimates comprises transmitting a command for maneuvering the UAV.

16. The system of claim 15, wherein the instructions further cause the processor to, prior to generating atmospheric parameter estimates, receive independent measurements of the atmospheric parameters of interest from one or more sensors independent of the sensors adapted for flight control and propulsion and not adapted for atmospheric measurements.

17. The system of claim 15, wherein the instructions further cause the processor to receive uncertainty information associated with the model and/or inputs and to generate estimates of uncertainty in the atmospheric parameter estimates.

18. The system of claim 15, wherein the UAV comprises a plurality of UAVs of the same aircraft type.

19. The system of claim 15, wherein the UAV comprises a plurality of UAVs of different aircraft types.

20. The system of claim 15, wherein the sensors not adapted for atmospheric measurements also include sensors adapted for mission management.

* * * * *